US011686608B2

(12) United States Patent
Hesslau

(10) Patent No.: US 11,686,608 B2
(45) Date of Patent: Jun. 27, 2023

(54) COLLAPSIBLE AND PORTABLE WEIGHT MEASURING DEVICE

(71) Applicant: Daniel Palladino Hesslau, Chicago, IL (US)

(72) Inventor: Daniel Palladino Hesslau, Chicago, IL (US)

( * ) Notice: Subject to any disclaimer, the term of this patent is extended or adjusted under 35 U.S.C. 154(b) by 96 days.

(21) Appl. No.: 17/211,040

(22) Filed: Mar. 24, 2021

(65) Prior Publication Data

US 2021/0302219 A1  Sep. 30, 2021

Related U.S. Application Data

(60) Provisional application No. 63/001,158, filed on Mar. 27, 2020.

(51) Int. Cl.
| *G01G 3/08* | (2006.01) |
| *G01G 19/44* | (2006.01) |
| *G01G 21/23* | (2006.01) |
| *G01G 3/14* | (2006.01) |

(52) U.S. Cl.
CPC ............. *G01G 3/1402* (2013.01); *G01G 3/08* (2013.01); *G01G 19/44* (2013.01); *G01G 21/23* (2013.01)

(58) Field of Classification Search
CPC ...... G01G 3/1402; G01G 19/44; G01G 21/23; G01G 3/08
See application file for complete search history.

(56) References Cited

U.S. PATENT DOCUMENTS

| 4,359,560 A | * | 11/1982 | Bauman | C08F 2/004 |
| | | | | 526/74 |
| 4,711,313 A | * | 12/1987 | Iida | G01G 21/28 |
| | | | | 177/127 |
| 5,393,935 A | * | 2/1995 | Hasty | G01G 19/445 |
| | | | | 177/144 |
| 5,780,781 A | * | 7/1998 | Berger | G01G 19/445 |
| | | | | 177/144 |
| 11,359,957 B2 | * | 6/2022 | Nieuwenhuis | G01G 19/445 |
| 2011/0185611 A1 | * | 8/2011 | Adams | G06K 19/06 |
| | | | | 235/494 |
| 2013/0044215 A1 | * | 2/2013 | Rothkopf | G06F 1/1698 |
| | | | | 345/173 |

* cited by examiner

*Primary Examiner* — Randy W Gibson
(74) *Attorney, Agent, or Firm* — McDonald Hopkins LLC; James P. Muraff

(57) ABSTRACT

A weight measuring device includes a top layer including a plurality of first flats and at least one bi-stable spring band. The plurality of first flats are connected to each other via the at least one bi-stable spring band. The weight measuring device further includes a bottom layer including a plurality second flats connected the plurality of first flats. The weight measuring device further includes at least one force sensor interposed between the top layer and the bottom layer. The weight measuring device further includes a processor configured to determine a weight of an object placed on the top layer or the bottom layer based on signals generated from the at least one force sensor.

24 Claims, 5 Drawing Sheets

COLLAPSIBLE AND PORTABLE WEIGHT MEASURING DEVICE

CROSS-REFERENCE TO RELATED APPLICATIONS

This application claims priority to and the benefit of U.S. Provisional Patent Application No. 63/001,158, entitled "WEIGHT MEASURING DEVICE," filed Mar. 27, 2020 which is incorporated by reference in its entirety.

TECHNICAL FIELD

The present disclosure generally relates to a weight measuring device and, more specifically, a portable weight measuring device.

BACKGROUND

During pediatric emergencies, paramedics are often required to administer one or more doses to young patients. The amount of administered dose is critical since it dictates whether the young patients experience adverse effects from the administered dose. To determine an appropriate amount of dose, the weight of a young patient is correlated to said amount. Conventionally, paramedics use measurement tools, such a Broselow tape, to measure the height of the young patient and correlate the height to an approximate weight. However, in many instances, such conventional approach inaccurately predicts the weight of the young patients. Further, employing generic weight measurement devices for such emergencies are impractical since these weight measurement devices are generally heavy, bulky, and cannot be readily stored in limited spaces of ambulances, medical bags, and/or other storage means used by the paramedics. Therefore, there is a need for an improved measurement tool that remedies these issues.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

An example weight measuring device is described herein. The weight measuring device includes a top layer including a plurality of first flats and at least one bi-stable spring band. The plurality of first flats are connected to each other via the at least one bi-stable spring band. The weight measuring device further includes a bottom layer including a plurality second flats connected the plurality of first flats. The weight measuring device further includes at least one force sensor interposed between the top layer and the bottom layer. The weight measuring device further includes a processor configured to determine a weight of an object placed on the top layer or the bottom layer based on signals generated from the at least one force sensor.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
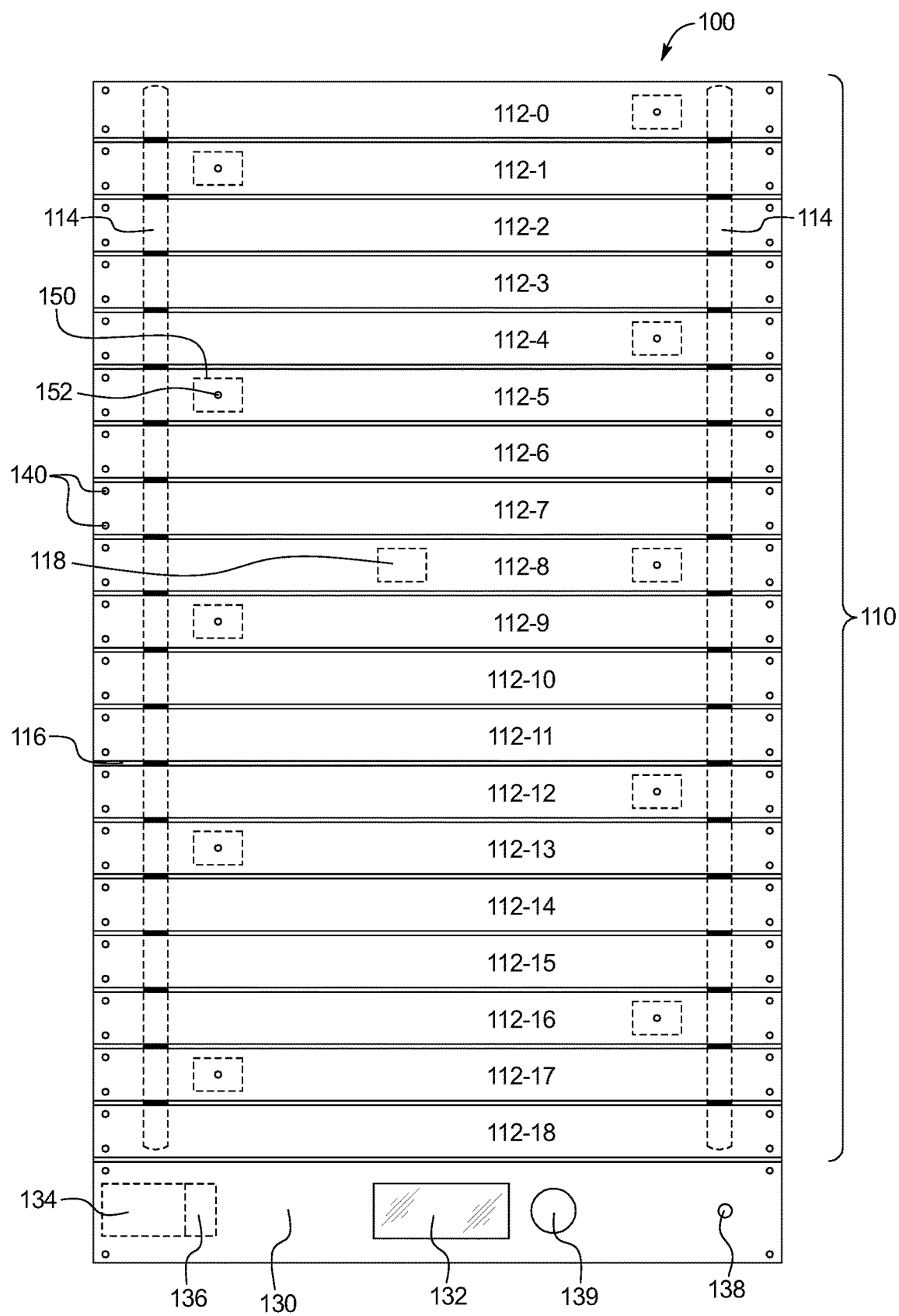
FIG. 1 illustrates a plan view of a weight measuring device in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As mentioned above, a Broselow tape is often inaccurate at providing the weight of a young patient. Other conventional weight measuring devices, such as generic scales, are generally heavy, bulky, and retain static shape and size that are impractical for storage and transportation.

An example weight measuring device includes a top layer and a bottom layer. The top layer includes a plurality first flats connected to each other via elastic bands and bi-stable spring bands. The bottom layer includes a plurality of second flats respectively connected to the plurality of first flats via a plurality of support pillars. A plurality of force sensors are interposed between the top layer and the second layer. A user may apply physical force to the top layer and/or the bottom layer to alter the shape of the weight measuring device. Specifically, the weight measuring device may be interchanged between two mechanically stable shapes. The first mechanically stable shape is planar or substantially planar and the second mechanically stable shape is cylindrical or substantially cylindrical shape. The weight measuring device includes computing units in communication with the force sensors to receive signals from the force sensors, process the signals to compute a weight, and cause a display device to present the weight.

Figure 2:
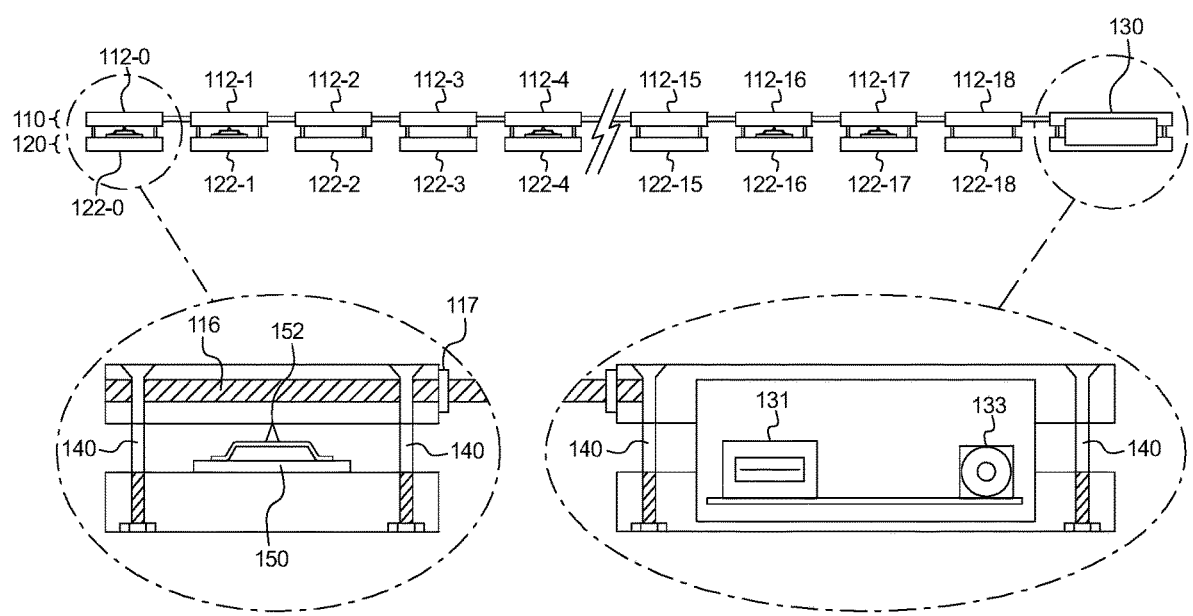
FIG. 2 illustrates a side view and detailed side views of head slat and tail slat of the weight measuring device of FIG. 1.
Figure 3:
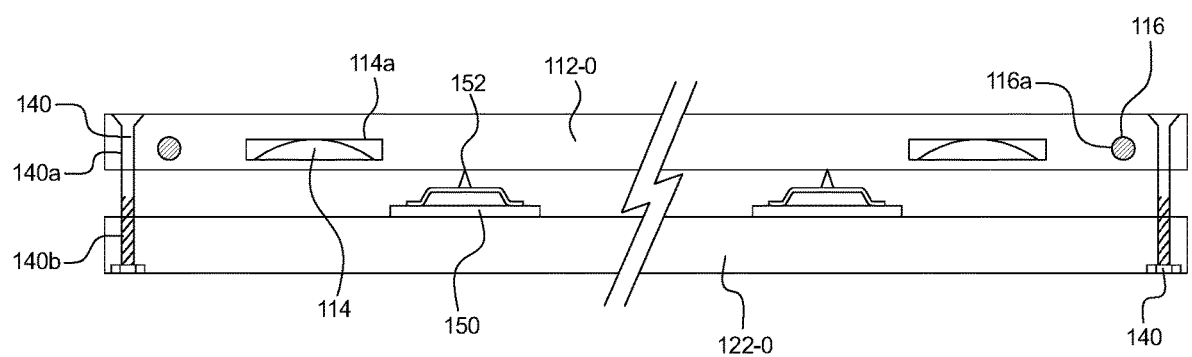
FIG. 3 illustrates a different side view of the weight measuring device of FIG. 1.

FIGS. 1, 2, and 3 illustrate the weight measuring device 100 in accordance with the teachings herein. The weight measuring device 100 includes a top layer 110, a bottom layer 120, a head slat 130, support pillars 140, and load cells 150.

In the illustrated embodiments, the top layer 110 includes a plurality of first slats 112-0 to 112-18. The plurality of first slats 112-0 to 112-18 are connected to each other via a pair of bi-stable spring bands 114 and a pair of elastic bands 116. The bi-stable spring bands 114 may be a layered, flexible stainless steel bi-stable spring bands. The bi-stable spring band 114 has a bi-stable structure, i.e., a structure having two stable mechanical shapes. In certain embodiments, the bi-stable spring band 114 may include two stable mechanical shapes, i.e., a linear shape and a curved shape. A user may directly apply force upon the bi-stable spring band 114, thereby interchanging the shape of the bi-stable spring band 114 from one shape to the other. Each of the elastic bands 116 may have ends that are greater in circumference, thereby ensuring that the plurality of first slats 112-0 to 112-18 remain connected to each other. In certain embodiments, each of the plurality of first slats 112-0 to 112-18 include inner surfaces defining a pair of first cavities 114a extending through opposing side surfaces of said first slat, a pair of second cavities 116a extending through opposing side surfaces of said first slat 112, a plurality of third cavities 140a extending through top and bottom surfaces of said first flat 112. The first cavity 114a is shaped to receive a portion of the bi-stable spring band 114. The second cavity 116a is shaped to receive a portion of the elastic band 116. In certain embodiments, each of the elastic bands 116 may include washers 117 wrapped thereon for each section of said elastic band 116 that enters/exits the second cavity 116a. The third cavity 140a is shaped to receive an end portion of the support pillar 140. While the illustrated embodiments depict the pair of bi-stable spring band 114 and the pair of elastic band 116, it should be appreciated that any number of bi-stable spring bands 114 and elastic bands 116 may be used for connecting the plurality of first slats 112-0 to 112-18 to each other.

In the illustrated embodiments, the bottom layer 120 includes a plurality of second slats 122-0 to 122-18. Each of the plurality of second flats 122-0 to 122-18 includes inner surfaces that define a plurality of fourth cavities 140b. The fourth cavity 140b is shaped to receive an opposing end portion of the support pillar 140. The third cavity 140a and fourth cavity 140b define a countersink for each of the plurality of first slats 112-0 to 112-18 and the plurality of second slats 122-0 to 122-18, respectively, thereby rendering a smooth surface for both the top surface of each of the plurality of first slats 112-0 to 112-18 and the bottom surface of each of the plurality of second slats 122-0 to 122-18. The plurality of first slats 112-0 to 112-18 and the plurality of second slats 122-0 to 122-18 are respectively connected to each other via the support pillars 140. The plurality of first slats 112-0 to 112-18 and the plurality of second slats 122-0 to 122-18 may be composed of one of the following non-exhaustive list of light-weight and durable materials: wood, polythene, polypropylene, polycarbonate, epoxy resin, melamine, and acrylic. The plurality of first slats 112-0 to 112-18 and the plurality of second slats 122-0 to 122-18, in conjunction with the bi-stable spring bands 114, enable the top layer 110 and the bottom layer 120 to interchange between two stable mechanical shapes, i.e., a planar or substantially planar shape and a cylindrical or substantially cylindrical shape. While the illustrated embodiments depict the plurality of first slats 112-0 to 112-18 and the plurality of second slats 122-0 to 122-18, it should be appreciated that any equal, non-zero, and non-singular number of first slats 112 and second slats 122 may be used for the top layer 110 and the bottom layer 120.

In the illustrated embodiments, the support pillars 140 are a combination of fastening screws, nuts, and washers. The height of the support pillars 140 may be adjusted via a tool, thereby altering the gap between the first slat 112 and the second slat 122. It should be appreciated that the support pillars 140 may be other fastening components/devices that are capable of connecting the plurality of first slats 112-0 to 112-18 and the plurality of second slats 122-0 to 122-18 and maintaining a gap between the plurality of first slats 112-0 to 112-18 and the plurality of second slats 122-0 to 122-18.

In the illustrated embodiments, the load cells 150 are interposed between the plurality of first slats 112-0 to 112-18 and the plurality of second slats 122-0 to 122-18. Each of the load cells 150 includes a strain gauge 152 mounted thereon. The strain gauge 152 abuts the bottom surface of the first slat 112 and the load cell 150 is mounted on the top surface of the second slat 122. In certain embodiments, the load cells 150 are secured to the bottom surface of one or more of the plurality of first slats 112-0 to 112-18. In the illustrated embodiments, the position of the load cells 150 alternate from one proximate end portion of the second slat 122 to the opposing proximate end portion of the second slat 122, and two load cells 150 are mounted for every pair of immediately proximate second slats 122 while skipping the subsequent pair of second slats 122, thereby ensuring proper functionality for measuring a weight of an object while minimizing the number of load cells 150 installed in the weight measuring device 100. However, it should be appreciated that other numbers and/or orientations of load cells 150 are contemplated for use in the weight measuring device 100. When a force is applied to the load cells 150, the resistance in the strain gauge 152 changes, thereby causing the load cells 150 to output voltages corresponding to those changes in the resistance. The output voltages may be transmitted to an amplifier 118 as signals. The amplifier 118 amplifies the signals generated by the load cells 150 and transmits the amplified signal to the controller 134, thereby improving clarity of data read from the amplified signal.

In the illustrated embodiments, the top layer 110 and the bottom layer 120 are connected to a head slat 130. In certain embodiments, the head slat 130 includes a display device 132 and a controller 134. In certain embodiments, the head slat 130 may further include a data input/output port 131, a power plug 133, a transmitter 136, a rotary encoder 138, power/"zero" weight user input device 139, and a power supply (not illustrated). The controller 130 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The controller 130 may further include memory, such as volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). The memory is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory the computer readable medium, and/or within the controller 134 during execution of the instructions. The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals. The controller 134 receives the amplified signals from the amplifier 118 for processing. Based on the amplified signals, the controller distinguishes the load cells 150 that are relevant for measuring the weight of an object placed on the weight measuring device 100. For example, if the object occupies one half of the upper layer 110, a set of load cells 150 positioned within said half of the upper layer 110 generates signals that are relevant for measuring the weight of an object placed on the weight measuring device 100. Subsequently, the controller 134 analyzes the amplified signals of relevant load cells 150. For example, the controller 134 may measure changes in resistance for each of the relevant load cells 150 over time, calculate the average, compare the average to proximate relevant load cells 150, etc. Based on these analyses, the controller 134 calculates the weight of the object, and causes the display device 132 to display the same. In certain embodiments, the controller 134 causes the transmitter 136 to transmit weight data to an external source, such as a pre-determined report writing system/agency. In certain embodiments, the display device 132 may be an LCD/LED/ULED display screen. In certain embodiments, the transmitter 136 may be a Bluetooth-enabled transmitter. In certain embodiments, the power supply may be a lithium battery.

In certain embodiments, the top layer 110 is concealed with a vinyl material (not illustrated). Since the vinyl material is flexible, the vinyl material effectively covers the top layer 110 without ripping or breaking. In certain embodiments, a nylon material is connected to the bottom surface of the bottom layer 120 via Velcro (not illustrated). The nylon material is used for the bottom layer 120 due to frequent impact with a ground surface. In certain embodiments, the vinyl material wraps around the top layer 110 to attach to the bottom layer 120 via Velcro. Velcro may be provided on opposing sides of the Along the perimeter of the vinyl material, Velcro may be provided on opposing sides of said perimeter, thereby enabling the vinyl material to attach to the bottom layer 120 and provide Velcro to further connect to the nylon material. In certain embodiments, the nylon material may further include Velcro straps attached thereto, thereby enabling the Velcro straps to secure the top layer 110 and the bottom layer 120 when the top layer 110 and the bottom layer 120 are maintaining the cylindrical or substantially cylindrical shape. In certain embodiments, the weight measuring device 100 includes a foam cushion interposed between the vinyl material and the top surface of the top layer 110.

In certain embodiments, the weight measuring device 100 further includes conveyance straps (not illustrated) situated along the length of the weight measuring device 100. The conveyance straps may be composed of nylon material, thereby improving durability of the weight measuring device 100.

Figure 4:
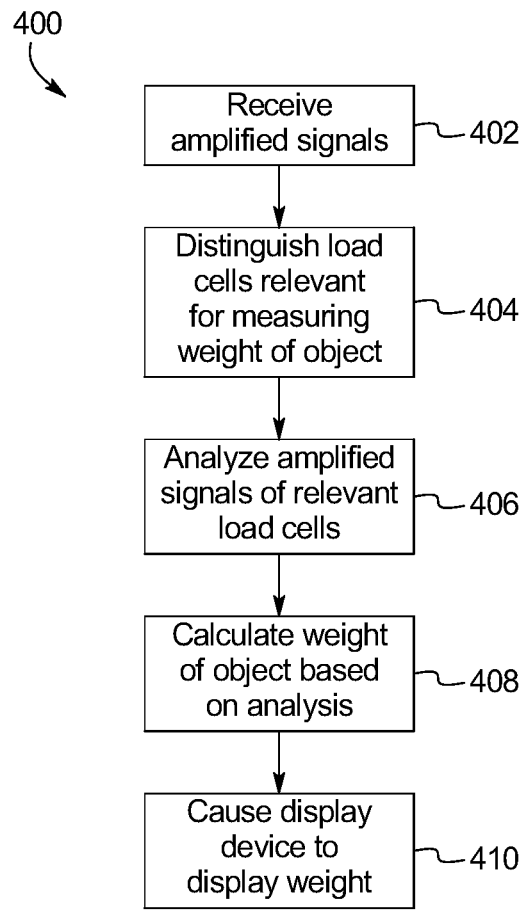
FIG. 4 illustrates a method of determining a weight of an object placed on the weight measuring device of FIG. 1.
Figure 5:
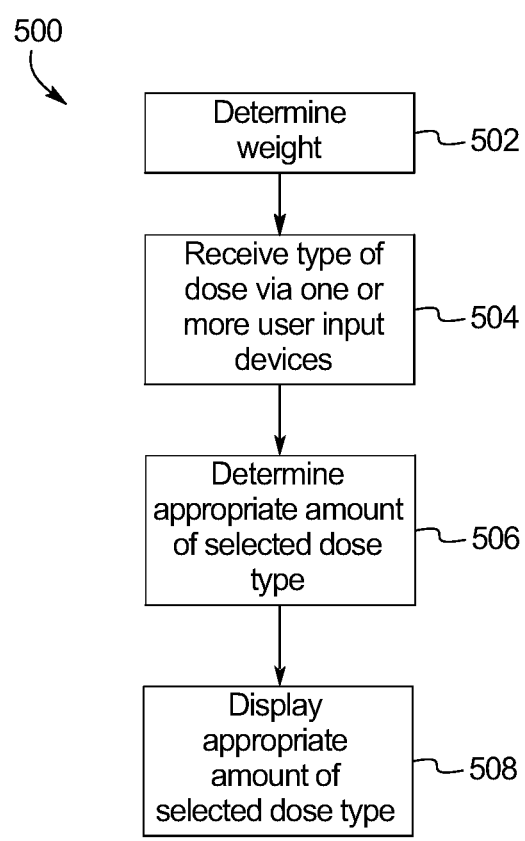
FIG. 5 illustrates a flowchart of a method for determining a weight of an object placed on the weight measuring device of FIG. 1.

FIG. 4 is a flowchart 400 of a method for determining a weight of an object placed on the weight measuring device 100, which may be implemented by the controller 134 of FIG. 1.

At block 402 the controller 134 receives signals generated by the load cells 150 and amplified by the amplifier 116.

At block 404, the controller 134 distinguishes one or more load cells 150 that are relevant for measuring the weight of the object.

At block 406, the controller 134 analyzes the amplified signals of the relevant load cells 150. For example, the controller 134 may measure changes in resistance for each of the relevant load cells 150 over time, calculate the average, compare the average to proximate relevant load cells 150, etc.

At block 408, the controller 134 calculates the weight of the object based on the analysis at block 406.

At block 410, the controller 134 causes the display device to display the weight of the object.

Although the example method is described with reference to the flowchart 400 illustrated in FIG. 4, many other methods for determining the weight of the object may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensors. "Modules" and "units" may also include firmware that executes on the circuitry. The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A weight measuring device comprising:
   a top layer comprising:
      a plurality of first flats; and
      at least one bi-stable spring band having two generally stable positions including a first stable planar position and a second stable cylindrical position, the plurality of first flats connected to each other via the at least one bi-stable spring band, with the plurality of first flats following the two generally stable positions of the bi-stable spring band when the bi-stable spring band is in the first stable planar position and the second stable cylindrical position, respectively;
   a bottom layer, the bottom layer comprising a plurality second flats connected the plurality of first flats;
   at least one force sensor interposed between the top layer and the bottom layer; and
   a processor configured to determine a weight of an object placed on the top layer based on signals generated from the at least one force sensor.

2. The weight measuring device of claim 1, wherein the at least one bi-stable spring band enables the top layer and the bottom layer to interchange between two stable shapes.

3. The weight measuring device of claim 2, wherein the two stable shapes are a planar or substantially planar shape and a cylindrical or substantially cylindrical shape.

4. The weight measuring device of claim 1, the top layer further comprising at least one elastic band, wherein the plurality of first flats are connected to each other via the at least one elastic band.

5. The weight measuring device of claim 4, wherein each of the plurality of first flats include at least one inner surface defining at least one cavity, and wherein the at least one elastic band extends through the at least one cavity of each of the plurality of first flats.

6. The weight measuring device of claim 1, further comprising a plurality of support pillars, wherein the plurality of first flats are connected to the plurality second flats via the support pillars.

7. The weight measuring device of claim 6, wherein the plurality of support pillars are positioned on opposing ends of each of the plurality of first flats and plurality of second flats.

8. The weight measuring device of claim 6, wherein the plurality of support pillars are adjustable to define a gap between the top layer and the bottom layer.

9. The weight measuring device of claim 1, wherein the at least one bi-stable spring band comprises two bi-stable spring bands, and wherein the two bi-stable spring bands are positioned within opposing ends of each of the plurality of first flats.

10. The weight measuring device of claim 1, wherein each of the plurality of first flats include at least one inner surface defining at least one cavity, and wherein the at least one bi-stable spring band extend through the at least one cavity of each of the plurality of first flats.

11. The weight measuring device of claim 1, wherein each of the at least one force sensor comprises:
a load cell mounted on one of the plurality of second flats; and
a strain gauge coupled to the load cell and facing one of the plurality of first flats.

12. The weight measuring device of claim 1, wherein each of the at least one force sensor is positioned closer to one end of one of the plurality of second flats than the opposing end of the one of the plurality of second flats.

13. The weight measuring device of claim 1, wherein only one or none of the at least one force sensor is mounted on each of the plurality second flats.

14. The weight measuring device of claim 1, further comprising an amplifier electrically coupled to the at least one force sensor and the processor, the amplifier configured to amplify the signals and transmit the amplified signals to the processor.

15. The weight measuring device of claim 1, further comprising a display device configured to display the weight of the object.

16. The weight measuring device of claim 1, further comprising a transmitter electrically coupled to the processor, the transmitter configured to wirelessly transmit the signals.

17. The weight measuring device of claim 1, further comprising at least one power supply electrically coupled to the processor.

18. The weight measuring device of claim 1, further comprising at least one input/output port electrically coupled to the processor and configured to electrically couple to an external device via a cord.

19. The weight measuring device of claim 1, wherein the plurality of first slate and the plurality of second late are composed of one of the following materials: wood, polythene, polypropylene, polycarbonate, epoxy resin, melamine, and acrylic.

20. A weight measuring device comprising:
a first layer having a first surface for supporting a small child or infant and having a second surface opposite to the first surface, the first layer comprising:
a plurality of flats; and
at least one bi-stable spring band having two generally stable positions including a first stable planar position and a second stable cylindrical position, the plurality of flats connected to each other via the at least one bi-stable spring band, with the plurality of flats following the two generally stable positions of the bi-stable spring band when the bi-stable spring band is in the first stable planar position and the second stable cylindrical position, respectively;
at least one force sensor secured proximate the second surface; and
a processor configured to determine a weight of the small child or infant when located on the first surface based on signals generated from the at least one force sensor.

21. The weight measuring device of claim 20, further comprising a second layer connected to the first layer, wherein the plurality of flats is a plurality of first flats, the second layer comprising a plurality of second flats connected to the plurality of first flats, respectively.

22. The weight measuring device of claim 21, wherein the at least one force sensor is interposed between at least one of the plurality of first flats and at least one of the plurality of second flats.

23. The weight measuring device of claim 21, further comprising a plurality of support pillars, wherein the plurality of first flats are connected to the plurality of second flats via the support pillars.

24. The weight measuring device of claim 20, wherein the at least one bi-stable spring band enables the first layer to interchange between a planar or substantially planar shape and a cylindrical or substantially cylindrical shape.

* * * * *